United States Patent [19]

Maggia

[11] 4,241,607
[45] Dec. 30, 1980

[54] TACHOMETER DEVICE CONTROLLED BY AN ELECTRIC MOTOR

[75] Inventor: Giorgio Maggia, Arese, Italy

[73] Assignee: Fratelli Borletti S.p.A., Milan, Italy

[21] Appl. No.: 30,271

[22] Filed: Apr. 16, 1979

[30] Foreign Application Priority Data

Apr. 21, 1978 [IT] Italy .................. 67912 A/78

[51] Int. Cl.$^3$ .......................... G01P 3/495; G01P 3/56
[52] U.S. Cl. ........................................ 73/490; 73/510;
73/519; 324/167
[58] Field of Search ............... 73/490, 519, 493, 510;
324/164, 167, 171, 174, 168

[56] References Cited

U.S. PATENT DOCUMENTS

| | | | |
|---|---|---|---|
| 3,505,879 | 4/1970 | Vanderberg | 73/519 X |
| 3,719,886 | 3/1973 | Vanderberg et al. | 324/167 |
| 3,863,151 | 1/1975 | Hahlganss | 324/167 |

Primary Examiner—James J. Gill

Attorney, Agent, or Firm—Gifford, VanOphem, Sheridan & Sprinkle

[57] ABSTRACT

A device (1) for transmitting rotary motion from a first to a second shaft and for measuring the angular speed of said rotary motion, comprising a first and second pulse generator associated respectively with said first and second shaft, and governing, by means of a processing circuit, the operation of an electric motor (2) of direct current type one shaft (7) of which is torsionally coupled to said second shaft; and a speed indicator comprising means (25) sensitive to magnetic field variations is described. The main feature of this device (1) is that said second pulse generator comprises a magneto-electrical transducer (32), and a permanent magnet (9) is torsionally coupled to said second shaft; said magnet (9) determining the activation either of said magneto-electrical transducer (32), or of those means (25) of said speed indicator which are sensitive to magnetic field variations.

12 Claims, 2 Drawing Figures

TACHOMETER DEVICE CONTROLLED BY AN ELECTRIC MOTOR

BACKGROUND OF THE INVENTION

This invention relates to a tachometer device controlled by an electric motor.

In particular, this invention relates to a tachometer device which enables rotary motion to be transmitted from a first to a second shaft by an electrical system, and enables the angular speed of said motion to be measured.

Known devices of the aforesaid type generally comprise a first and second electrical signal generator which at their outputs provide pulses which have a recurrence frequency proportional to the angular speed of the first and second said shaft respectively. In addition, by means of a processing circuit, such generators govern the operation of a preferably direct current electric motor, one shaft of which is torsionally coupled to the second aforesaid shaft.

The operating principle of these known devices consists of supplying the electric motor with a signal proportional to the difference between the angular speeds of the two shafts, as determined by the respective generators, so as to keep the speed of the second shaft substantially equal to the speed of the first.

An indicator and an integrator are connected to the second shaft in order to indicate respectively the angular speed of the first shaft and the number of revolutions made thereby. By using such devices on vehicles, the speed of movement and the distance travelled by the vehicle can be measured.

The advantage of a considerable noise reduction is obtained, because a flexible cable is not required for transmitting motion from the first to the second shaft. Furthermore, because the direct current electric motor has a high static torque, the second shaft is easily set into rotation, so preventing any undesirable crawling thereof.

However, these devices have certain drawbacks, which are particularly related to the practical embodiment of the described concept.

In particular, the processing circuit is complicated and easily subject to faults, because of which it requires constant checks and maintenance by expert personnel. Moreover, the various component parts (motor, second pulse generator, indicator and integrator) are often bulky to assemble, and large seats have to be made available to house them.

SUMMARY OF THE INVENTION

The object of the present invention is to provide a tachometer device which, while having all the advantages of known tachometer devices, obviates the aforesaid drawbacks thereof.

According to the present invention, there is provided a device for transmitting rotary motion from a first to a second shaft and for measuring the angular speed of said rotary motion, comprising a first and second pulse generator associated respectively with said first and second shaft, and governing, by means of a processing circuit, the operation of an electric motor of direct current type one shaft of which is torsionally coupled to said second shaft; and a speed indicator comprising means sensitive to magnetic field variations, wherein said second pulse generator comprises a magneto-electrical transducer, and a permanent magnet is torsionally coupled to said second shaft; said magnet determining the activation either of said magneto-electrical transducer, or of those means of said speed indicator which are sensitive to magnetic field variations.

BRIEF DESCRIPTION OF THE DRAWINGS

The present invention will be more apparent from the description given hereinafter by way of non-limiting example of a preferred embodiment with reference to the accompanying drawing, in which.

DETAILED DESCRIPTION OF THE INVENTION

Figure 1:
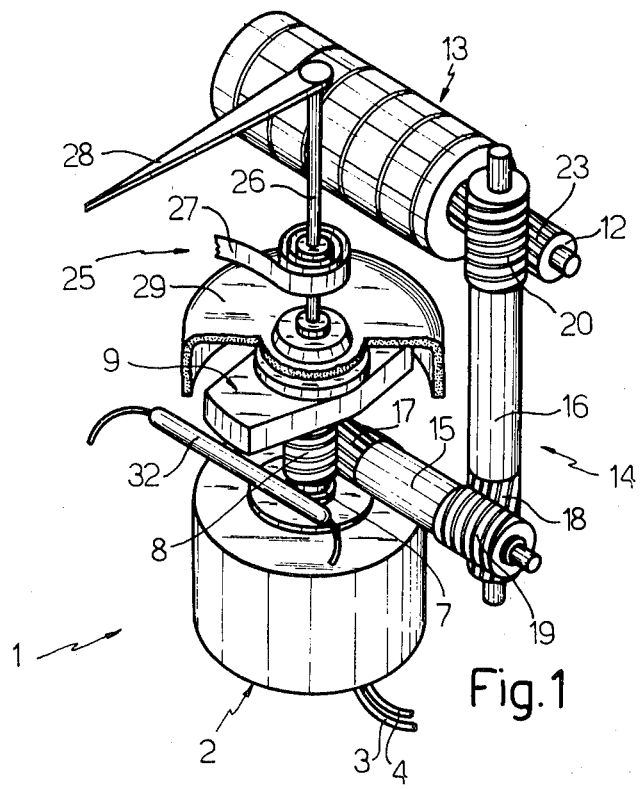
FIG. 1 is a partly sectional perspective view of a mechanical part of a device according to the present invention.

FIG. 1 shows a tachometer device, indicated overall by 1, and provided with a preferably direct current electric motor 2, supplied by cables 3 and 4. From the motor 2 there extends axially a drive shaft 7 which supports a worm 8 and a magnet 9 comprising two opposing poles.

The shaft 7 is torsionally coupled to a shaft 12 of a roller integrator unit 13 by a transmission linkage 14 which in particular includes shafts 15 and 16 disposed at 90° to each other and comprising respectively at opposite ends gears 17 and 18 with helical teeth and worms 19 and 20. The motion is transmitted from the shaft 7 to the shaft 12 by way of the worm 8, the helical gear 17 and worm 19 of the shaft 15, the helical gear 18 and worm 20 of the shaft 16, and a helical gear 23 provided on the shaft 12 and engaging with the worm 20.

According to the present invention, the magnet 9 is required to carry out two distinct functions.

A first function is to operate a moving element, indicated overall by 25, for indicating the speed of the drive shaft 7. This element 25 is of known type and comprises a shaft 26 rotatable against the action of an opposing spring 27, and a pointer 28 and disc 29 connected to opposite ends of the shaft. In particular, the disc 29 is mounted facing the magnet 9 and is arranged to form the seat of parasite currents (Foucault currents) when the magnet 9 is rotated by the shaft 7 of the motor 2.

A second function performed by the magnet 9 is to operate a magneto-electrical transducer 32, which in the example illustrated is an electrical reed contact, by the flux generated by said opposite poles. In particular, during the course of one angular rotation of 360° of the shaft 7, the electrical contact contained in the transducer 32 is alternately opened and closed twice consecutively.

Figure 2:
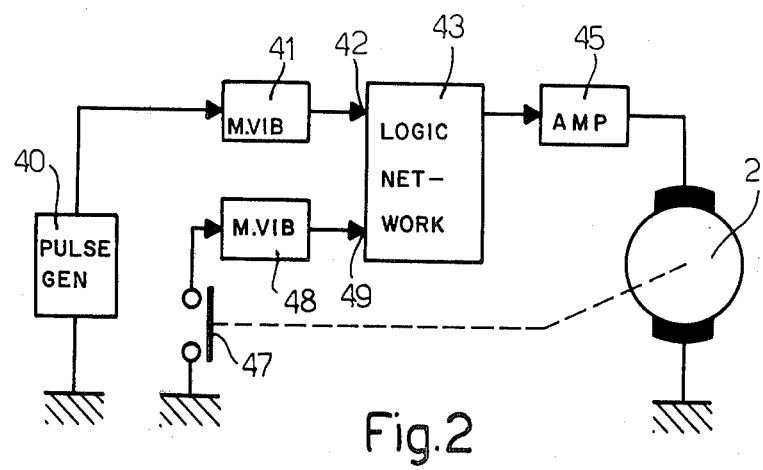
FIG. 2 is a block diagram of an electronic control circuit for the device according to the invention.

With particular reference to FIG. 2, a pulse generator 40 has one terminal connected to ground and comprises an output at which pulses are present having a frequency proportional to the rotational speed of a shaft (not shown), this output being fed through a monostable multivibrator 41 to a set input 42 of a logic combining network 43 preferably formed from a bistable multivibrator.

The output of the network 43, at which there is present a logic signal of level "1" after each instant in which a signal is received at the input 42, is fed through an amplifier circuit 45 to a first supply terminal of the motor 2, a second terminal of which is connected to ground. In particular, the amplifier 45 comprises a damping circuit by means of which logic step signals present at its input are converted into output signals which develop gradually, so as to prevent sudden variations in the current supplied to the motor 2.

Finally, by means of the magnet 9 of FIG. 1, this motor operates an electrical switch 47, of which a first terminal is connected to ground and a second terminal is connected through a monostable circuit 48 to a reset input 49 of the combining network 43. A signal present at this input resets a logic level "0" at the output of the logic network 43, when this latter is at a logic level "1".

The operation of the tachometer device according to the invention is as follows. It will firstly be assumed that the shaft of which the angular speed is to be measured is at rest, and thus the pulse generator 40 associated therewith does not emit any signal at its output. Consequently the output of the network 43 is at the logic level "0" and consequently the motor 2 is not supplied, and remains at rest, and likewise the integrator unit 13 and the pointer 28 of the moving element 25 are also inactivated.

When the shaft associated with the pulse generator 40 is put into motion, a train of pulses will be present at the generator output having a recurrence frequency proportional to the angular speed of rotation of the shaft. These pulses, when fed through the monostable circuit 41 to the input 42 of the logic network 43, put the output of this network to the logic level "1" and thus cause the motor 2 to be supplied through the amplifier 45. The motor shaft 7 begins to rotate, and causes the switch 47 associated with the magneto-electrical transducer 32 to close by means of one of the two poles of the magnet 9. Becuase of the structure of the magnet 9, the switch 47 closes after, at the most, one angular rotation of 180° of the shaft 7, and when it closes, the input of the monostable circuit 98 is short-circuited to ground. The output of this latter thus feeds a pulse to the input 49 of the logic network 43, which resets its output to the logic level "0", and thus interrupts the supply to the motor 2. This motor is still able to make a slight rotation due to its own inertia before stopping. However, as the shaft associated with the pulse generator 40 moves with angular rotation, a new activation pulse almost instantaneously reaches the input 42 of the logic network 43 through the monostable circuit 41, because of which the output of the logic network 43 returns to the logic level "1", the electric motor 2 is again supplied and a cycle similar to that heretofore described is repeated. In particular, during the course of one cycle between two successive activations of the motor 2, the ratio of the presence to the absence of supply to the motor is considerably greater than one if the pulses received at the input 42 of the network 43 have a recurrence frequency greater than those received at the input 49 of said network 43. Under these conditions, the motor 2 progressively increases its angular speed of rotation until it reaches an equilibrium state, under which the supply voltage to it serves only to overcome the friction encountered during the rotation of the motor, and its shaft 7 rotates substantially at the same speed as the shaft associated with the pulse generator 40.

Thus, the total number of revolutions and the angular speed of rotation of the shaft under control are indicated respectively by the integrator unit 13 operated by the motor shaft 7 by way of the transmission linkage 14, and by the pointer 28 of the moving element 25 which is activated by the magnetic field variations induced by the magnet 9 in the disc 29.

If this latter speed varies relative to a nominal value, it leads to a variation in the said ratio of the presence to the absence of supply to the motor 2, and consequently a change in the angular speed of rotation of the motor 2 towards the new required value.

During these speed variations and during the start of the motor 2, the supply current is transmitted to this latter gradually by the effect of the network contained in the amplifier 45, so preventing sudden undesirable stresses on the motor.

From an examination of the characteristics of the present invention, it is apparent that it attains the aforesaid objects.

In this respect, the facility of using the permanent magnet 9 both for indicating the angular speed of rotation by means of the moving element 25, and for generating a reaction signal for controlling the motor 2 via the magneto-electrical transducer 32, allows very compact assembly of the various component parts of the tachometer device 1, so reducing overall dimensions to a minimum. Moreover, from the mechanical aspect, the device according to the invention differs from a tachometer device operated by a flexible cable only by the addition of the motor 2 and the provision of a seat for housing the transducer 32. It is therefore possible to utilize the entire top part comprising the integrator unit 13, the transmission linkage 14, the moving element 25 and the worm 8 with the magnet 9 to construct either a traditional tachometer device operated by a flexible cable, or an electrically controlled tachometer device, for this latter it being necessary to add only an electric motor and a magneto-electrical transducer of common type to fulfil the mechanical requirements.

Although the tachometer device according to the invention has been described particularly for use in the automobile field, it can also be advantageously used for determining any angular speed of rotation and for counting the total number of revolutions of any shaft. In addition, because the connection between the shaft under control and the tachometer device is made only by electric cables, the device 1 can be disposed at any distance from the shaft of which the angular speed is to be measured. When this favorable characteristic, which is already known in presently available devices, is associated with the simple and compact structure of the device 1, it allows the assembly to be used advantageously where it is required to check the speed of a plurality of shafts from a single central position, in which a monitoring panel can be disposed having very small overall dimensions.

Finally, it is apparent that modifications can be made to the present invention which are not outside the scope thereof.

For example, the number of poles on the magnet 9 is not limited, and in particular a magnet having four poles could be used which would reduce the fluctuations of the pointer 28 at low rotational speeds of the shaft 7, corresponding to low cruising speeds of the vehicle being measured.

Furthermore, the magneto-electrical transducer 32 could be in the form of a magneto-resistor, a coil, a proximity switch, a probe sensitive to the Hall effect, or generally any device sensitive to the presence of a magnetic field, for example an oscillating circuit in which the presence on absence or oscillations depends on predetermined values of the magnetic field.

What I claim is:

1. A device for transmitting rotary motion from a first shaft and to a second shaft and for measuring the angular speed of said rotary motion, said device comprising:
   a first and second pulse generator respectively associated with said first and second shaft,
   a direct current electric motor having a rotary output operatively coupled to said second shaft,
   processing circuit means responsive to said pulse generators for controlling the activation of said electric motor, and
   speed indicator means comprising a permanent magnet secured to said second shaft and means responsive to rotation of said permanent magnet for indicating the speed of rotation of said permanent magnet,
   wherein said second pulse generator comprises a magneto-electrical transducer which is actuated by and at predetermined rotational positions of said magnet.

2. A device as defined in claim 1, wherein said magneto-electrical transducer is constituted by a magnetically operable electrical contact, or an element sensitive to the Hall effect, or a magneto-resistor, or a proximity switch, or an oscillating circuit in which the presence or absence of oscillations depends on predetermined magnetic field values.

3. A device as defined in claim 1, wherein said processing circuit comprises a logic network with a first and a second input connected respectively to the outputs of said first and second pulse generators; and an output at which, when a pulse has been received at said first input, there is continuosly present an electrical signal for supplying said motor, and at which said electrical signal is annulled when a pulse is received at said second input.

4. A device as defined in claim 3, wherein said logic network comprises a bistable multivibrator.

5. A device as defined in claim 3, wherein a monostable multivibrator is disposed between each output of said pulse generators and each input of said logic network.

6. A device as defined in claim 3, wherein the output of said logic network supplies said electric motor via an amplifier circuit.

7. A device as defined in claim 6, wherein said amplifier circuit comprises an electrical damping network arranged to prevent sudden variation in a supply current fed to said electric motor.

8. A device as defined in claim 1, wherein the second shaft is torsionally coupled, by a transmission linkage including at least one worm-helical gear coupling, to an integrator unit for indicating and memorizing the number of revolutions made by said second shaft.

9. A device as defined in claim 8, mounted on a mobile vehicle for measuring the running speed of said vehicle and for indicating the distance travelled by said vehicle.

10. A device as defined in claim 1, wherein said motor has an output shaft which forms said second shaft.

11. A device for transmitting rotary motion from a first to a second shaft and for measuring the angular speed of said rotary motion, comprising a first and second pulse generator associated respectively with said first and second shaft, and governing, by means of a processing circuit, the operating of an electric motor of direct current type, one shaft of which is torsionally coupled to said second shaft; and a speed indicator for indicating the speed of the second shaft comprising means sensitive to magnetic field variations, wherein said second pulse generator comprises a magneto-electrical transducer, and a permanent magnet is torsionally coupled to said second shaft; said magnet determining the activation either of said magneto-electrical transducer, or of those means of said speed indicator which are sensitive to magnetic field variations wherein said processing circuit comprises a logic network with a first and a second input connected respectively to the outputs of said first and second pulse generator; and an output at which, when a pulse has been received at said first input, there is continuously present an electrical signal for supplying said motor, and at which said electrical signal is annulled when a pulse is received at said second input.

12. A device for transmitting rotary motion from a first to a second shaft and for measuring the angular speed of said rotary motion, comprising:
   a first and second pulse generator associated respectively with said first and second shaft,
   circuit means responsive to said pulse generators for generating an output signal upon receipt of a pulse from said first pulse generator and for annulling said output signal upon receipt of a pulse from said second pulse generator,
   electric motor means having an activating input, and an output shaft drivingly connected to said second shaft,
   said circuit means output signal being connected to the activating input of said motor means,
   a permanent magnet connected to said second shaft, said permanent magnet controlling the activation of the second pulse generator, and
   speed indicator means responsive to the rotational speed of the permanent magnet for visually indicating the rotational speed of the second shaft.

* * * * *

UNITED STATES PATENT AND TRADEMARK OFFICE
CERTIFICATE OF CORRECTION

PATENT NO. : 4,241,607
DATED : December 30, 1980
INVENTOR(S) : Giorgio Maggia

It is certified that error appears in the above-identified patent and that said Letters Patent are hereby corrected as shown below:

Column 4, line 66, first occurrence delete "on" and insert --or-- therefor;

Column 4, line 66, delete "or" and insert --of-- therefor.

Signed and Sealed this

Fourteenth Day of April 1981

[SEAL]

Attest:

RENE D. TEGTMEYER

Attesting Officer  Acting Commissioner of Patents and Trademarks